Aug. 16, 1949.  J. D. BOLESKY  2,479,034

THERMOSTATIC VALVE

Filed Oct. 12, 1945

John D. Bolesky,
Inventor.
Haynes and Koenig,
Attorneys.

Patented Aug. 16, 1949

2,479,034

UNITED STATES PATENT OFFICE 2,479,034

THERMOSTATIC VALVE

John D. Bolesky, Attleboro, Mass., assignor to Metals & Controls Corporation, Attleboro, Mass., a corporation of Massachusetts Application October 12, 1945, Serial No. 621,929

6 Claims. (Cl. 236—34)

This invention relates to valves and more particularly to thermostatic valves.

Among the objects of this invention are the provision of thermostatic valves for controlling the flow of liquids; the provision of thermostatic valves for liquids which are controlled by the temperature of the liquid passing through; the provision of thermostatic valves which respond proportionately to proportionate changes in temperature of the liquid passing through; and, the provision of a thermostatic valve which contains few parts, is simple in construction, is economical in cost and is easily manufactured and installed. Other objects will be in part apparent and in part pointed out hereinafter.

In the accompanying drawing, in which are illustrated several of various possible embodiments of the invention, Fig. 1 is a diagram of a cooling system for an internal combustion engine;

Similar reference characters indicate corresponding parts throughout the several views of the drawings.

Figure 1:
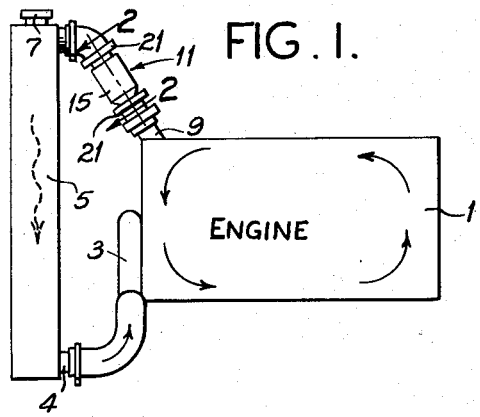

The valves of the present invention are particularly suited for the thermostatic control of liquids in a cooling system. For illustrative purposes they will be described as applied to the cooling system of an internal combustion engine for a motor vehicle.

Motor vehicles in large part employ a liquid cooling medium which is circulated between the internal combustion engine and a suitable radiating device which cools the fluid before it is returned to the internal combustion engine. It is advantageous under operating conditions where the engine is cold to by-pass the radiator and recirculate the cooling fluid to the internal combustion engine. This procedure is terminated when the temperature of the cooling fluid reaches a predetermined point, and the cooling fluid is then passed to the radiator by the opening of a suitable thermostatic valve. Such valves customarily operate at a predetermined temperature to completely open the circuit to the radiator. Similarly the valve is usually relatively tightly closed when the temperature of the cooling system is below the predetermined point.

According to the present invention a thermostatic valve is provided to control the flow of cooling fluid to the radiator. The valve after beginning operation permits a gradually increasing flow of fluid to the radiator as the temperature of the fluid increases. Also the valve, when in its closed position, does not entirely prevent flow of cooling fluid to the radiator although such flow is almost cut off.

Referring now to the drawing, an engine 1 is illustrated diagrammatically together with a pump 3 for the cooling fluid, a radiator 5, an opening 7 for filling the radiator, and a return connection 9 from engine 1 to radiator 5. The lower outlet 4 from radiator 5 is connected to pump 3. In operation of the motor at normal temperatures of the cooling fluid, the liquid is forced by pump 3 through engine 1, out connection 9, through radiator 5 where it is cooled, out the outlet 4 to pump 3 and so on.

Figure 4:
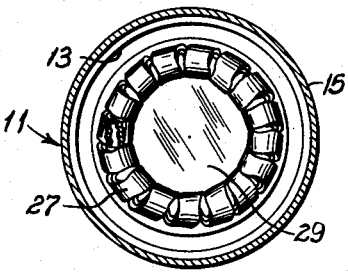
Fig. 4 is a section taken on line 4—4 of Fig. 2.
Figure 2:
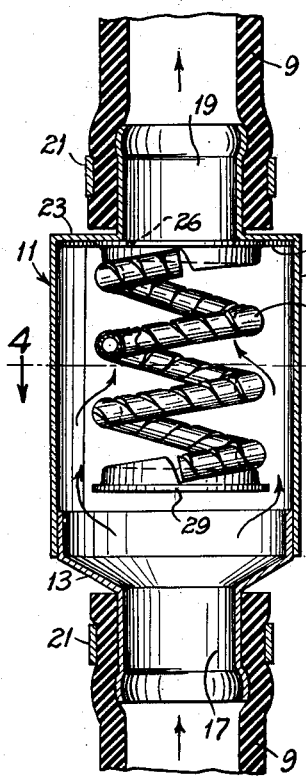
Fig. 2 is a section taken on line 2—2 of Fig. 1.
Figure 3:
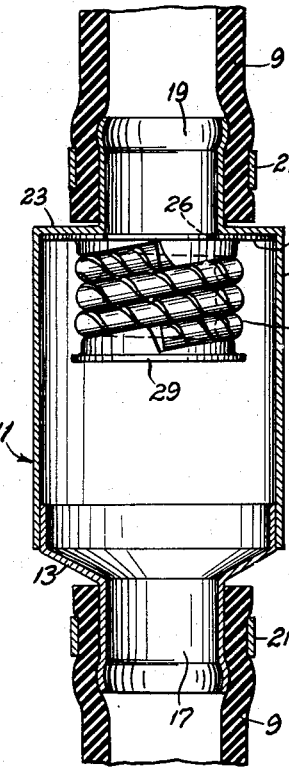
Fig. 3 is a view similar to Fig. 2, showing the valve in a different position.

In return connection 9 is located a check valve 11, constructed in accordance with the present invention and illustrated more particularly in Figs. 2, 3 and 4.

Check valve 11 comprises a thin-walled metal housing constituting a valve chamber made in two telescoping parts, 13 and 15. The lower part 13 has an open neck portion 17 forming an inlet, and a similar neck portion 19 on the upper part 15 serves as an outlet. Necks 17 and 19 are secured to return connection hose 9 by clamps 21 or other conventional means.

Upper part 15 has a shoulder 23 below neck 19 against which is seated an end plate 25. Plate 25 has an opening 26 which coincides with neck 19, and welded or otherwise secured thereto surrounding the opening 26 the upper end of a helical bimetallic thermostatic element 27 constructed to expand axially upon increase in temperature and constituting a valve member. Thermostatic element 27 may be constructed in accordance with the teachings of Parsons Patent 2,121,259 and is illustrated as comprising a composite thermostatic strip which is coiled about a minor axis to form a minor helix which is in turn coiled about a major axis to form a major helix adapted to expand and contract axially in response to temperature change thereby to vary the spacing of its convolutions.

At the opposite end of thermostatic element 27 is secured, as by welding, a closure comprising solid end plate 29. Plate 29 closes the open end of thermostatic element 27 to retard the flow of liquid through valve 11 when thermostatic element 27 is in its constricted or fully contracted position (see Fig. 3) wherein its convolutions are substantially closed for restricting flow. In closed position valve 11 will not be entirely watertight since some leakage will occur through the coils of thermostatic element 27. This leakage tends to equalize the pressure on the movable parts of the valve to allow the valve when heated to creep open slowly with small increments of temperature.

Preferably the annular space between housing 15 and the outer diameter of thermostatic element 27 should be approximately equal to or greater than the cross sectional area of return connection 9. Also the inner diameter of thermostatic element 27 is preferably substantially the same as the inner diameter of return connection hose 9. This permits free unrestricted flow of the cooling liquid when valve 11 is completely open, that is, when the helix 27 is fully expanded (Fig. 2) with its convolutions wide open for maximum flow without blocking the inlet 17.

Valve 11 is easily assembled. Helical thermostatic element 27 with perforated end plate 25 attached at one end and solid end plate 29 on the other may be inserted as a unit within housing 15, where plate 25 is held against shoulder 23 by friction with the walls of housing 15. This construction centers the axis of helical thermostatic element 27 with hose 9. The cooperating housing 13 is thereupon telescoped within the end of housing 15 and welded or soldered thereto.

The flow of liquid through valve 11 may be the reverse of that described above and shown by the arrows in Fig. 2, if desired. In this instance, however, the liquid pressure upon plate 29 changes the operating characteristics of valve 11. Such characteristics are inherent in thermostatic element 27 so that a differently constructed element 27 is preferably supplied when the liquid flow through valve 11 is reversed.

If preferred in lieu of having the thermostatic element 27 seat against shoulder 23 and plate 25, helical thermostatic member 27 may be wound so as to contract upon increase in temperature, and thermostatic element 27 located so as to seat plate 29 against a valve opening when the element expands to a predetermined distance.

Although the internal diameter of the coils of thermostatic element 27 is preferably substantially the same as the diameter of neck 19, the internal diameter may be larger, if desired. Also the internal diameter of thermostatic element 27, in the embodiment of the invention shown in Figs. 2-4, may be decreased if desired to the point where the external diameter of the helical coils of element 27 approximate the diameter of neck 19.

Figure 5:
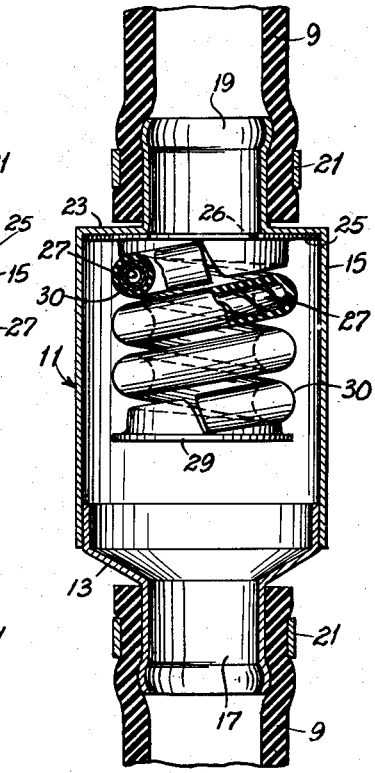
Fig. 5 is a modification of the embodiment shown in Fig. 2.

In Fig. 5 there is shown a modification of the above embodiment, which may be used if it is desired to protect the surfaces of the thermostatic element 27 against corroding action of the water, and to reduce the amount of leakage. In this case, a flexible protective tubing 30 of rubber or synthetic plastic such as vinyl is slipped over the turns of the helical thermostat member as shown. The perforated end plate 25 and the solid end plate 29 may be bonded or cemented to the flexible tubing, by the use of adhesives well-known in the art, which will withstand the action of the hot water in the cooling system of the motor vehicle. Plate 29 can be either metal or a sheet of relatively stiff plastic. The open ends of tube 30 should be sealed closed for maximum protection. If minimum leakage is the only factor to be considered, the ends of tube 30 may be left open.

In view of the above, it will be seen that the several objects of the invention are achieved and other advantageous results attained.

As many changes could be made in the above construction without departing from the scope of the invention, it is intended that all matter contained in the above description or shown in the accompanying drawing shall be interpreted as illustrative and not in a limiting sense.

I claim:

1. A thermostatic valve comprising a valve chamber having an inlet and an outlet, a thermostatic valve member in said chamber, said valve member comprising a bimetallic thermostatic strip coiled about a minor axis to form a minor helix which is in turn coiled about a major axis to form a major helix adapted to expand and contract axially in response to temperature change thereby to vary the spacing of its convolutions, one end of said major helix being fixed with respect to said chamber surrounding said outlet, the other end of said major helix being freely movable in said chamber and provided with a closure, said valve member being enclosed within a flexible protective tube which closes the spaces between the convolutions of said minor helix.

2. A thermostatic valve comprising a valve chamber having an inlet opening and an outlet opening, a thermostatic valve member in the chamber comprising a composite thermostatic strip coiled to form a helix adapted to expand and contract axially in response to temperature change thereby to vary the spacing of its convolutions, one end of the helix being fixed in position surrounding one of the openings, the other end of the helix being provided with a closure to confine fluid flowing through said chamber from its inlet to its outlet opening to flow between the variably-spaced convolutions of the helix, said helix being free to expand axially from a fully contracted position wherein its convolutions are substantially closed for restricting flow to a fully expanded position wherein its convolutions are wide open for maximum flow without blocking the other of said openings.

3. A thermostatic valve comprising a valve chamber having an inlet opening and an outlet opening, a thermostatic valve member in the chamber comprising a composite thermostatic strip coiled about a minor axis to form a minor helix which is in turn coiled about a major axis to form a major helix adapted to expand and contract axially in response to temperature change thereby to vary the spacing of its convolutions, one end of the major helix being fixed in position surrounding one of the openings, the other end of the major helix being provided with a closure to confine fluid flowing through said chamber from its inlet to its outlet opening to flow between the variably-spaced convolutions of the helix, said major helix being free to expand axially from a fully contracted position wherein its convolutions are substantially closed for restricting flow to a fully expanded position wherein its convolutions are wide open for maximum flow without blocking the other of said openings.

4. A thermostatic valve as set forth in claim 3 wherein the valve member is enclosed within a flexible protective tube which closes the spaces between the convolutions of said minor helix.

5. A thermostatic valve comprising a valve chamber having an inlet opening and an outlet opening, a thermostatic valve member in the chamber comprising a composite thermostatic strip coiled to form a helix adapted to expand and contract axially in response to temperature change thereby to vary the spacing of its convolutions, one end of the helix being fixed in position surrounding the outlet opening, the other end of the helix being provided with a closure to confine fluid flowing through the chamber from its inlet to its outlet opening to flow between the variably-spaced convolutions of the helix, said helix being free to expand axially from a fully contracted position wherein its convolutions are substantially closed for restricting flow to a fully expanded position wherein its convolutions are wide open for maximum flow without blocking the inlet opening.

6. A thermostatic valve comprising a valve chamber having an inlet opening and an outlet opening, a thermostatic valve member in the chamber comprising a composite thermostatic strip coiled to form a helix adapted to expand axially upon heating and to contract axially upon cooling thereby to vary the spacing of its convolutions, one end of the helix being fixed in position surrounding one of the outlet openings, the other end of the helix being provided with a closure to confine fluid flowing through the chamber from its inlet to its outlet opening to flow between the variably-spaced convolutions of the helix, said helix being free to expand axially upon heating from a fully contracted position wherein its convolutions are substantially closed for restricting flow to a fully expanded position wherein its convolutions are wide open for maximum flow without blocking the inlet opening.

JOHN D. BOLESKY.

REFERENCES CITED

The following references are of record in the file of this patent:

UNITED STATES PATENTS

| Number | Name | Date |
| --- | --- | --- |
| 260,148 | Allen | June 27, 1882 |
| 593,399 | Leitch | Nov. 9, 1897 |
| 1,079,985 | Kaminsky | Dec. 2, 1913 |
| 1,813,122 | Moore | July 7, 1931 |
| 1,924,372 | Peteler | Aug. 29, 1933 |
| 2,434,393 | Chace | Jan. 13, 1948 |

FOREIGN PATENTS

| Number | Country | Date |
| --- | --- | --- |
| 369,001 | Great Britain | Mar. 17, 1932 |